United States Patent
Murayama et al.

(10) Patent No.: US 7,986,735 B2
(45) Date of Patent: Jul. 26, 2011

(54) DIGITAL SIGNAL TRANSMISSION APPARATUS AND METHOD, DIGITAL SIGNAL RECEIVING APPARATUS AND METHOD, AND DIGITAL SIGNAL TRANSMISSION SYSTEM

(75) Inventors: Hideaki Murayama, Kanagawa (JP); Nobuyuki Ishikawa, Kanagawa (JP); Yoshihiro Morioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1128 days.

(21) Appl. No.: 11/789,052

(22) Filed: Apr. 23, 2007

(65) Prior Publication Data

US 2008/0174664 A1    Jul. 24, 2008

(30) Foreign Application Priority Data

Apr. 25, 2006 (JP) ................................ P2006-120734

(51) Int. Cl.
H04L 27/00 (2006.01)
(52) U.S. Cl. ...................................................... 375/259
(58) Field of Classification Search .................. 375/257, 375/259–260, 295, 316
See application file for complete search history.

(56) References Cited

U.S. PATENT DOCUMENTS

| | | | | |
|---|---|---|---|---|
| 6,279,158 B1 * | 8/2001 | Geile et al. | ...................... | 725/126 |
| 6,334,219 B1 * | 12/2001 | Hill et al. | ...................... | 725/106 |
| 7,069,577 B2 * | 6/2006 | Geile et al. | ...................... | 725/106 |
| 7,302,158 B1 * | 11/2007 | Asato et al. | ...................... | 386/52 |
| 7,385,916 B2 * | 6/2008 | Geile et al. | ...................... | 370/208 |
| 7,492,791 B2 * | 2/2009 | Geile et al. | ...................... | 370/480 |
| 7,535,822 B2 * | 5/2009 | Geile et al. | ...................... | 370/208 |
| 7,773,537 B2 * | 8/2010 | Geile et al. | ...................... | 370/252 |
| 2008/0049599 A1 * | 2/2008 | Dapper et al. | ................ | 370/208 |
| 2009/0080552 A1 * | 3/2009 | Dapper et al. | ................ | 375/260 |
| 2009/0316816 A1 * | 12/2009 | Geile et al. | ...................... | 375/260 |
| 2010/0014605 A1 * | 1/2010 | Geile et al. | ...................... | 375/260 |

FOREIGN PATENT DOCUMENTS

| | | |
|---|---|---|
| JP | 7 143086 | 6/1995 |
| JP | 8-294098 | 11/1996 |
| JP | 10 341357 | 12/1998 |
| JP | 2000-13298 | 1/2000 |
| JP | 2004-235752 | 8/2004 |
| JP | 2004-336482 | 11/2004 |

* cited by examiner

Primary Examiner — Jean B Corrielus
(74) Attorney, Agent, or Firm — Frommer Lawrence & Haug LLP; William S. Frommer; Ellen Marcie Emas

(57) ABSTRACT

A digital signal transmission apparatus that transmits a digital signal to another apparatus via a coaxial cable connected therebetween includes a signal divider configured to divide a digital signal to be transmitted into a plurality of signal groups; a plurality of modulators configured to modulate each of the plurality of signal groups obtained by the signal divider by using an orthogonal frequency division multiplexing method; a plurality of frequency shifters configured to shift each of the frequency bands of a plurality of modulation signals generated by the plurality of modulators from a baseband to a mutually different frequency band; and a signal sender configured to combine a plurality of modulation signals whose frequency bands are shifted by the plurality of frequency shifters and to transmit the signals to the coaxial cable.

2 Claims, 9 Drawing Sheets

DIGITAL SIGNAL TRANSMISSION APPARATUS AND METHOD, DIGITAL SIGNAL RECEIVING APPARATUS AND METHOD, AND DIGITAL SIGNAL TRANSMISSION SYSTEM

CROSS REFERENCES TO RELATED APPLICATIONS

The present invention contains subject matter related to Japanese Patent Application JP 2006-1207341 filed in the Japanese Patent Office on Apr. 25, 2006, the entire contents of which are incorporated herein by reference.

BACKGROUND OF THE INVENTION

1. Field of the Invention

The present invention relates to a digital signal transmission apparatus and a method for transmitting a digital signal, which are suitably used to transmit a video signal between, for example, a camera and a camera control unit (CCU), to a digital signal receiving apparatus and a method for receiving a digital signal, and to a digital signal transmission system.

2. Description of the Related Art

In the related art, when a plurality of cameras are used, for example, in drama shooting in a studio or in shooting a baseball game, a plurality of cameras are placed at different places in order to capture each necessary scene. The plurality of cameras are usually centrally controlled at one place.

Each camera is connected to an individual camera control unit (CCU) that controls the camera and that supplies electrical power to the camera. The reason for this is that, if a power supply is secured at one place, it is possible to supply electrical power to each camera. Another reason is that centralized control is more convenient because an input to a switcher that receives signals from a plurality of CCUs and that selectively outputs a predetermined signal becomes easier by applying synchronization without phase difference to individual cameras.

A video signal is transmitted mutually between a camera and a CCU. That is, a captured-image video signal is sent as a main line signal from the camera to the CCU, and conversely, a return video signal for confirming a final main line video that is recorded by a cameraman or that is on-air is sent from the CCU to the camera.

In the related art, for bidirectional video signal transmission between a camera and a CCU, when broadly classified, there are three types of method described below.

(1) There is bidirectional video signal transmission that involves transmission using an optical fiber cable. Since video transmission between a camera and a CCU is bidirectional transmission, it is common practice that two optical fiber cables, one for the upstream and one for the downstream, are used to perform digital transmission. That is, one optical fiber cable is used to send a main line signal from the camera to the CCU, and the other optical fiber cable is used to send a return video signal from the CCU to the camera.

FIG. 6 shows a transmission system 200A using an optical fiber cable. The transmission system 200A is configured in such a manner that a camera 201 and a CCU 202 are connected to each other with an optical fiber cable 203. A remote controller 204 and monitors 205 to 207 are connected to the CCU 202.

(2) There is bidirectional video signal transmission that involves transmission using a type of coaxial cable called a triaxial cable. This is a method in which a double-shielded wire of a triaxial cable is used, signals in both directions, including that for the power supply, are modulated, and frequency multiplexing transmission is performed. A transmission system using a triaxial cable in this manner is disclosed in, for example, Japanese Unexamined Patent Application Publication No. 1998-341357.

FIG. 7 shows an analog transmission system 200B using a triaxial cable. The transmission system 200B is configured in such a manner that a camera 201 and a CCU 202 are connected to each other with a triaxial cable 208.

In this case, a digital video signal as a main line signal that is output from the camera 201 or a return video signal output from the CCU 202 are each converted into an analog video signal by using a D/A converter, thereafter FM modulation or AM modulation is performed thereon, and bidirectional transmission is performed by means of a frequency multiplexing method using a multiplex filter. On the reception side, the analog video signal that is obtained after FM demodulation or AM demodulation is performed once thereon is A/D-converted into a digital video signal and is output.

FIG. 8 shows an example of the circuit configuration on the camera 201 side and on the CCU 202 side. On the camera 201 side, digital video signals as main line signals, that is, a luminance signal Y that is 10-bit parallel data and color difference signals Cb/Cr that are 10-bit parallel data, are each converted from a digital signal into an analog signal by D/A converters 210 and 211. Thereafter, the signals are AM-modulated by AM modulators 212 and 213, and the signals are combined by a multiplex filter 214 and are sent to a triaxial cable 208. The color difference signals Cb/Cr indicate sequence signals of a blue color difference signal Cb and a red color difference signal Cr.

In connection with the above, on the CCU 202 side, the AM-modulated signals of the luminance signal Y and the color difference signals Cb/Cr are separated and extracted from the triaxial cable 208 by a multiplex filter 215. Thereafter, the AM-modulated signals are demodulated by AM demodulators 216 and 217, the AM-modulated signals are converted from analog signals into digital signals by A/D converters 218 and 219 in order to obtain a luminance signal Y and color difference signals Cb/Cr, which are 10-bit parallel data.

On the CCU 202 side, a return video signal Ret. Video (luminance signal Y) that is 10-bit parallel data is converted from a digital signal into an analog signal by a D/A converter 220. Thereafter, the signal is FM-modulated by an FM modulator 221, and the signal is sent to the triaxial cable 208 through the multiplex filter 215.

In connection with the above, on the camera 201 side, an FM-modulated signal of the return video signal Ret. Video is extracted from the triaxial cable 208 by the multiplex filter 214. Thereafter, the FM-modulated signal is demodulated by an FM demodulator 222, the signal is converted from an analog signal into a digital signal by the conversion, and a return video signal Ret. Video (Y) is obtained by an A/D converter 223.

FIG. 9 shows an example of the arrangement of frequencies of an analog transmission system using a triaxial cable. The center frequency of the AM-modulated signals (the color difference signals Cb/Cr) transmitted from the camera 201 to the CCU 202 is set at 21.6 MHz. The center frequency of the AM-modulated signal (the luminance signal Y) transmitted from the camera 201 to the CCU 202 is set at 64.8 MHz. The center frequency of the FM-modulated signal (the luminance signal Y) transmitted from the CCU 202 to the camera 201 is set at 126 MH. As a result, the frequency bands are made different.

Although not shown in the example of the circuit configuration of FIG. 8, an audio signal and a control signal, which are frequency-multiplexed, are transmitted between the camera 201 and the CCU 202. FIG. 9 also shows an audio signal SA1 transmitted from the camera 201 to the CCU 202, and an audio signal SA2 transmitted from the CCU 202 to the camera 201.

(3) As a system for bidirectionally transmitting digital video by using a triaxial cable, there is a transmission system using a time-domain multiplexing method. That is, a time period is divided so that a time period during which a main-line video signal is sent and a time period during which a return video signal is sent are alternately determined, and by repeating this operation, bidirectional transmission is performed. In this system, management of time is difficult. Furthermore, as the transmission distance becomes longer, the wait time for the sent video signal to be reached becomes longer, and the time period for sending a video signal becomes shorter.

SUMMARY OF THE INVENTION

In the case of (1), the optical fiber cable enables a signal of a very wide band to be transmitted and also, since transmission loss in optical power is small, long distance transmission is easily possible. For this reason, this transmission is in dominant use in the case of an HD (High-Definition) camera system. However, since optical fiber cables are expensive, their use outdoors where there is much dust and dirt is a matter of concern, and cleaning the end surfaces of connectors is troublesome. Another problem is that, if optical fiber cables are handled roughly, they can be broken, and once broken, repairs are difficult. The bidirectional transmission method which employs one optical fiber cable and uses wavelength multiplexing is expensive because the divider/combiner necessary for wavelength multiplexing is expensive and a laser diode whose wavelength is managed is necessary and is also expensive.

In the case of (2), a digital video signal output from the camera or the CCU is returned once to an analog signal and the signal is returned again to a digital video signal on the output side and therefore, it is difficult to avoid the deterioration of the signal. Furthermore, since FM modulation/demodulation or AM modulation/demodulation of an analog signal is performed for the transmission, a deterioration in S/N also occurs. Furthermore, as the transmission distance becomes longer, since the C/N of the transmission line decreases, the S/N of a video becomes poor.

In the case of (3), management of time is difficult, and as the transmission distance becomes longer, the waiting time for the sent video signal to be reached becomes shorter, presenting a problem in that it is difficult to transmit a signal of a wide band like an HD video signal.

It is desirable to enable a digital signal to be satisfactorily transmitted through a coaxial cable.

According to an embodiment of the present invention, there is provided a digital signal transmission apparatus that transmits a digital signal to another apparatus via a coaxial cable connected therebetween, the digital signal transmission apparatus including: a signal divider configured to divide a digital signal to be transmitted into a plurality of signal groups; a plurality of modulators configured to modulate each of the plurality of signal groups obtained by the signal divider by using an orthogonal frequency division multiplexing method; a plurality of frequency shifters configured to shift each of the frequency bands of a plurality of modulation signals generated by the plurality of modulators from a baseband to a mutually different frequency band; and a signal sender configured to combine a plurality of modulation signals whose frequency bands are shifted by the plurality of frequency shifters and to transmit the signals to the coaxial cable.

In an embodiment of the present invention, a digital signal to be transmitted is divided into a plurality of signal groups, and the signal groups are modulated in accordance with an orthogonal frequency division multiplexing method. Even when the bit rate of a digital signal to be transmitted is high, the bit rate of each of the signal groups obtained by the division becomes low. Therefore, digital modulation for each signal group becomes possible. In this case, a digital signal may also be divided into a plurality of signal groups after a data compression process is performed on the digital signal to be transmitted, and in this case, the bit rate can be decreased further.

For example, when digital video signals (e.g., a luminance signal Y and color difference signals Cb/Cr) as main line signals (captured-image video signals) are to be sent from the camera to the CCU via a coaxial cable, the digital video signals as the main line signals become digital signals to be transmitted. Furthermore, for example, when a digital video signal (for example, a luminance signal Y) as a return video signal is to be sent from the CCU to the camera via a coaxial cable, the digital video signal as a return video signal becomes a digital signal to be transmitted.

A plurality of modulation signals related to a plurality of signal groups are combined after the frequency bands of the modulation signals are each shifted from the baseband to a mutually different frequency band and are sent to a coaxial cable. Since the modulation signals are shifted so that the frequency bands of the plurality of modulation signals related to the plurality of signal groups are mutually different, it is possible to satisfactorily transmit them in such a manner that the plurality of signal groups do not interfere with one another. In this case, when a plurality of modulation signals are similarly sent from a transmission location, the plurality of modulation signals are arranged so that the above-described frequency bands of the plurality of modulation signals do not overlap the frequency bands of the plurality of modulation signals from the transmission location. As a result, bidirectional transmission via one coaxial cable becomes possible.

As described above, a plurality of modulation signals related to a plurality of signal groups sent to a coaxial cable are supplied to another apparatus via the coaxial cable. In the other apparatus, first, the plurality of modulation signals are separated and obtained from the coaxial cable. After the frequency bands of the plurality of the obtained modulation signals are returned to a baseband, the modulation signals are demodulated, and a plurality of signal groups are generated. Then, the plurality of signal groups are combined to obtain a digital signal to be received.

The plurality of signal groups obtained by dividing a digital signal are sent to a coaxial cable after each of them is modulated by an orthogonal frequency division multiplexing method, and the symbol rate can be decreased so as to be lower than the bit rate of the digital signal. Therefore, even if reflection occurs in the connector portion or the like, the influence thereof is not easily received, and the digital signal can be satisfactorily transmitted via the coaxial cable. Furthermore, the digital signal is not converted into an analog signal, AM modulation or FM modulation is not performed thereon, and is not transmitted via the coaxial cable. Consequently, the deterioration in S/N does not occur, and the digital signal can be transmitted at a distance longer than that in an analog transmission system.

According to embodiments of the present invention, after a digital signal is divided into a plurality of signal groups, each of the signal groups is modulated by an orthogonal frequency division multiplexing method and is sent to a coaxial cable. It becomes possible to modulate even a digital signal with a high bit rate by an orthogonal frequency division multiplexing method. Furthermore, as a result of the modulation, the symbol rate can be decreased so as to be lower than the bit rate of the digital signal. Therefore, even if reflection occurs in the connector portion or the like, the influence thereof is not easily received, and the digital signal can be satisfactorily transmitted through the coaxial cable.

DESCRIPTION OF THE PREFERRED EMBODIMENTS

Figure 1:
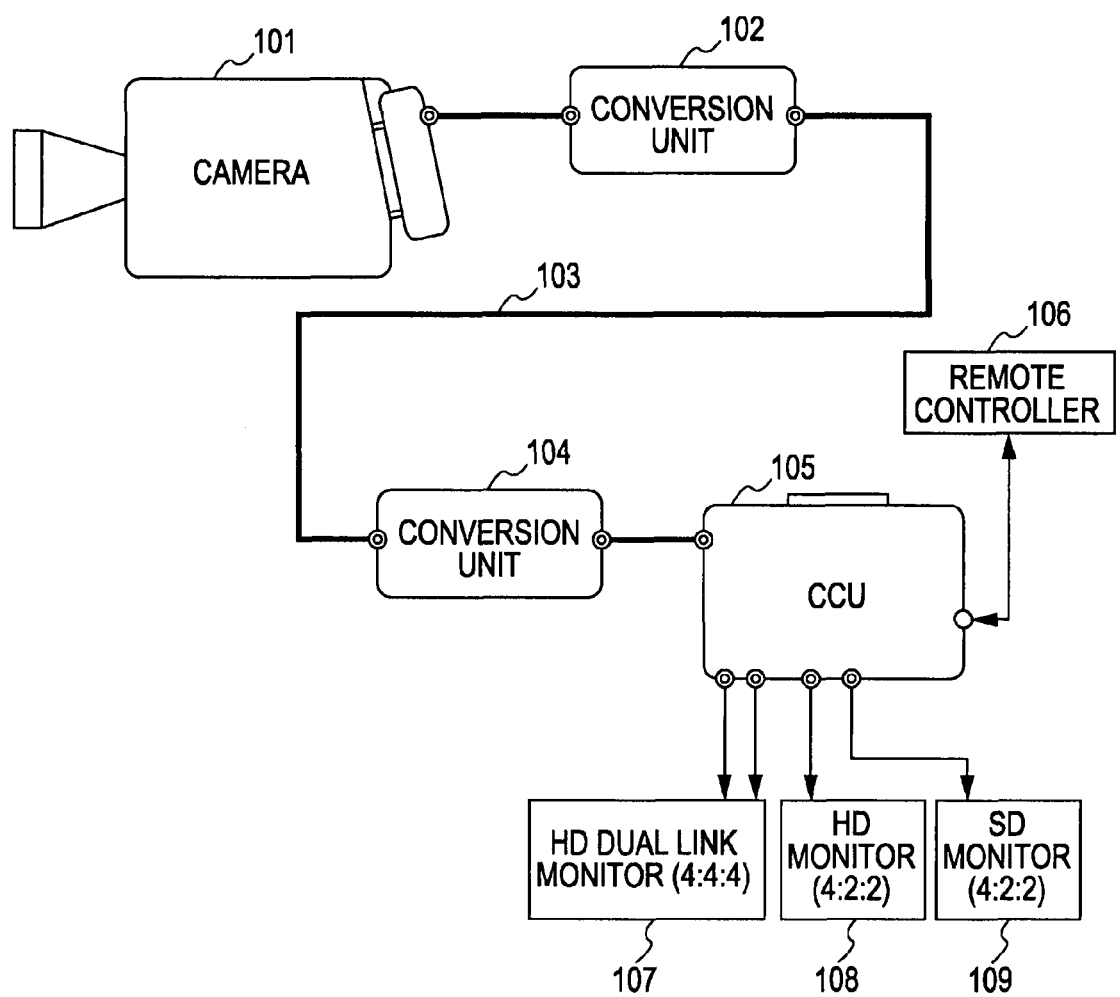
FIG. 1 is a block diagram showing the configuration of a transmission system using a triaxial cable according to an embodiment of the present invention.

Embodiments of the present invention will be described below with reference to the drawings. FIG. 1 shows the configuration of a transmission system 100 using a triaxial cable according to an embodiment of the present invention. The transmission system 100 includes a camera 101, a conversion unit 102, a triaxial cable 103 as a coaxial cable, a conversion unit 104, and a CCU 105.

The camera 101 captures an image of a subject. A captured-image video signal is transmitted as a main line signal from the camera 101 to the CCU 105. The CCU 105 controls the camera 101 and also supplies electrical power to the camera 101. A return video signal is transmitted from the CCU 105 to the camera 101. A remote controller 106 and monitors 107 to 109 are connected to the CCU 105.

The conversion unit 102 is provided between the camera 101 and the triaxial cable 103. The conversion unit 102 divides a luminance signal Y and color difference signals Cb/Cr, which are digital video signals constituting the main line signals output from the camera 101, into a plurality of signal groups, modulates each of the signal groups by an orthogonal frequency division multiplexing (OFDM) method, shifts the frequency band of each of the modulation signals from the baseband to a mutually different frequency band, and sends the signals to the triaxial cable 103. Furthermore, the conversion unit 102 demodulates the signal groups by shifting the frequency bands of the plurality of modulation signals obtained by an OFDM method to the baseband, which are related to the plurality of signal groups obtained by dividing a return video signal Ret. Video sent from the CCU 105 side via the triaxial cable 103, combines the plurality of obtained signal groups in order to obtain a return video signal Ret. Video, and supplies the return video signal Ret. Video (the luminance signal Y) to the camera 101.

Figure 2:
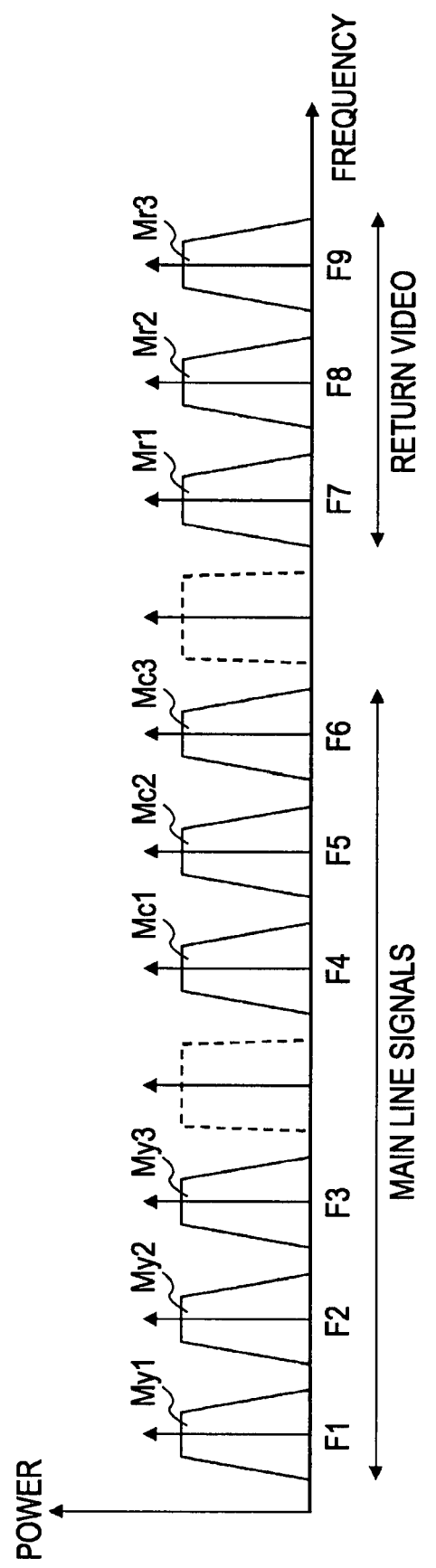
FIG. 2 shows an example of the arrangement of frequencies of modulation signals related to main line signals and a return video signal, which are transmitted via a triaxial cable.

FIG. 2 shows an example of the arrangement of frequencies of modulation signals related to main line signals and a return video signal, which are transmitted via the triaxial cable 103. In this embodiment, for the sake of simplicity of description, it is assumed that the luminance signal Y and the color difference signals Cb/Cr constituting the main line signals transmitted from the camera 101 to the CCU 105 are each divided into three signal groups, and the return video signal Ret. Video (Y) transmitted from the CCU 105 to the camera 101 is divided into three signal groups.

Modulation signals My1, My2, and My3 related to the three signal groups obtained by dividing the luminance signal Y are shifted in frequency so that their respective center frequencies become F1, F2, and F3. The modulation signals Mc1, Mc2, and Mc3 related to the three signal groups obtained by dividing the color difference signals Cb/Cr are shifted in frequency so that their respective center frequencies become F4, F5, and F6. The modulation signals Mr1, Mr2, and Mr3 related to the three signal groups obtained by dividing the return video signal Ret. Video are shifted in frequency so that their respective center frequencies become F7, F8, and F9. Since the signals are shifted in frequency so that the modulation signals do not overlap one another in the manner described above, it is possible to transmit the modulation signals through the triaxial cable 103 in such a way that the luminance signal Y, the color difference signals Cb/Cr, and the return video signal Ret. Video do not interfere with one another.

The conversion unit 104 is provided between the CCU 105 and the triaxial cable 103. The conversion unit 104 divides the return video signal Ret. Video (Y) that is a digital video signal output from the CCU 102 into a plurality of signal groups, modulates each signal group by an OFDM method, shifts the frequency band of each modulation signal from a baseband to a mutually different frequency band, and sends the signal group to the triaxial cable 103. Furthermore, the conversion unit 104 demodulates the signal groups by shifting the frequency bands of a plurality of modulation signals obtained by modulating the signal group by the OFDM method to the baseband, which are related to a plurality of signal groups obtained by dividing the luminance signal Y and the color difference signals Cb/Cr that constitute the main line signals, which are sent from the camera 101 via the triaxial cable 103, combines the plurality of obtained signal groups in order to obtain a luminance signal Y and color difference signals Cb/Cr, and supplies the signals to the CCU 105.

A description will be given of the operation of the transmission system 100 using a triaxial cable, which is shown in FIG. 1.

The luminance signal Y and the color difference signals Cb/Cr constituting the main line signals, which are output from the camera 101, are supplied to the conversion unit 102 on the camera 101 side. In the conversion unit 102, each of the luminance signal Y and the color difference signals Cb/Cr is divided into three signal groups, and each signal group is modulated by the OFDM method.

Then, the modulation signals My1, My2, and My3 related to the luminance signal Y are each shifted in frequency so that their respective center frequencies become F1, F2, and F3, as shown in FIG. 2, and thereafter are sent to the triaxial cable 103. The modulation signals Mc1, Mc2, and Mc3 related to the color difference signals Cb/Cr are each shifted in frequency so that their respective center frequencies become F4, F5, and F6, as shown in FIG. 2, and thereafter are sent to the triaxial cable 103.

The modulation signals My1, My2, My3, Mc1, Mc2, and Mc3 sent to the triaxial cable 103 in the manner described above are supplied to the conversion unit 104 on the CCU 105 side via the triaxial cable 103. In the conversion unit 104, after the frequency bands of the modulation signals My1, My2, My3, Mc1, Mc2, and Mc3 are each shifted to the baseband, the modulation signals My1, My2, My3, Mc1, Mc2, and Mc3 are demodulated, six signal groups related to the luminance signal Y and the color difference signals Cb/Cr are obtained, the signal groups are combined, and the luminance signal Y and the color difference signals Cb/Cr are obtained. Then, the luminance signal Y and the color difference signals Cb/Cr are supplied from the conversion unit 104 to the CCU 105.

On the other hand, the return video signal Ret. Video (Y) output from the CCU 105 is supplied to the conversion unit 104 on the CCU 105 side. In the conversion unit 104, the return video signal Ret. Video is divided into three signal groups, and each signal group is modulated by the OFDM method. Then, the modulation signals Mr1, Mr2, and Mr3 related to the return video signal Ret. Video are shifted in frequency so that their respective center frequencies become F7, F8, and F9, as shown in FIG. 2, and thereafter are sent to the triaxial cable 103.

The modulation signals Mr1, Mr2, and Mr3 sent to the triaxial cable 103 in the manner described above are supplied to the conversion unit 102 on the camera 101 side via the triaxial cable 103. In the conversion unit 102, the modulation signals Mr1, Mr2, and Mr3 are demodulated after the frequency bands of the modulation signals Mr1, Mr2, and Mr3 are each shifted to the baseband, three signal groups related to the return video signal Ret. Video are obtained, the signal groups are combined, and the return video signal Ret. Video is obtained. Then, the return video signal Ret. Video is supplied from the conversion unit 102 to the camera 101.

Figure 3:
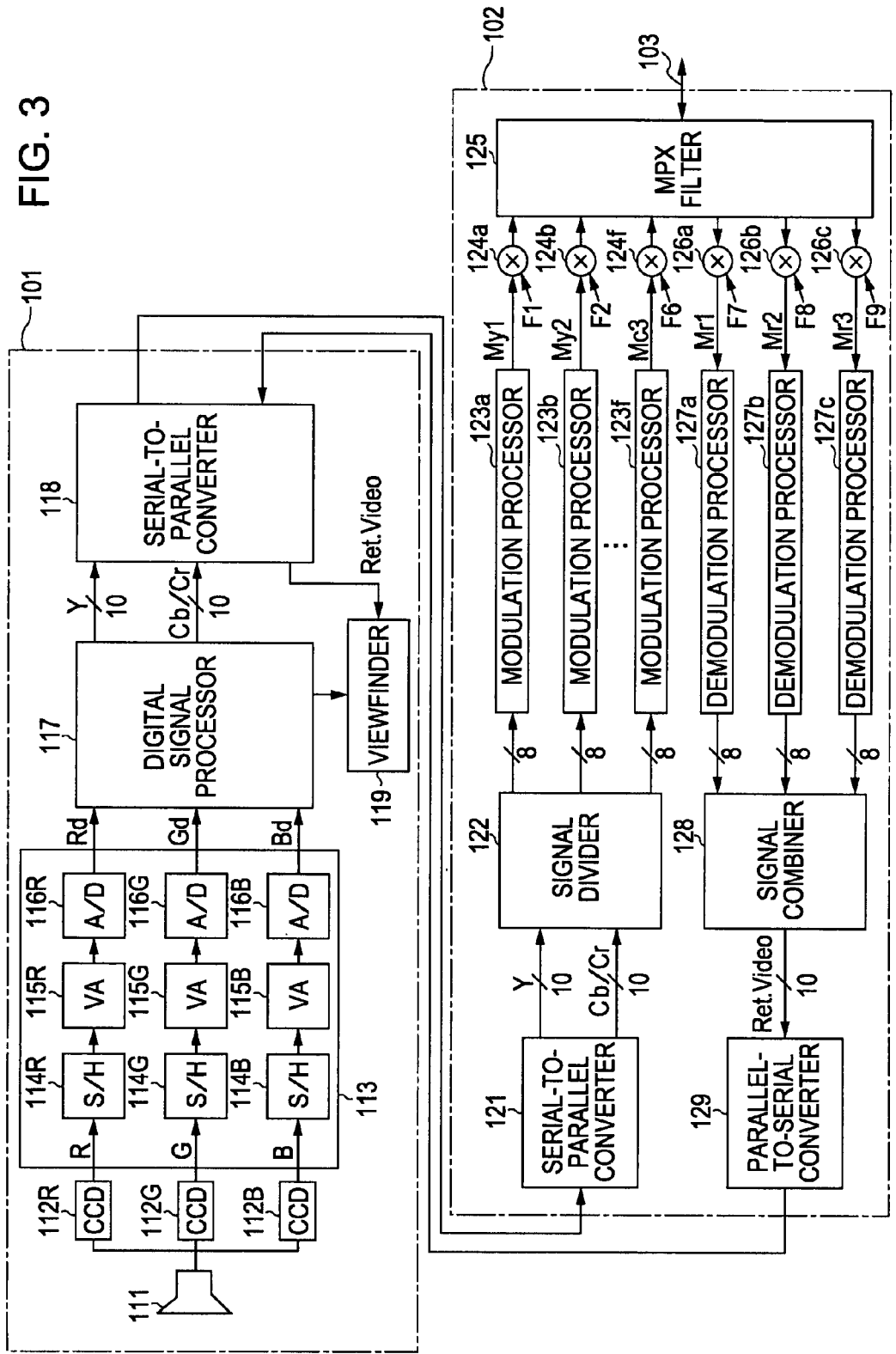
FIG. 3 is a block diagram showing a detailed configuration on the camera side.

Next, a description will be given of the details of the configuration of the camera 101 side, that is, the configuration of the camera 101 and the conversion unit 102. FIG. 3 shows the configuration thereof.

The camera 101 includes an image-capturing optical system 111 formed image-capturing lenses and the like, CCD (Charge Coupled Devices) solid-state image-capturing elements 112R, 112G, and 112B for obtaining red, green, blue image-captured signals, respectively, an analog signal processor 113, a digital signal processor 117, a converter 118 for performing conversion from a serial signal to a parallel signal and vice versa, and a viewfinder 119.

The analog signal processor 113 performs a process for sampling and holding a signal of each pixel for each of the red, green, blue image-capturing signals R, G, and B obtained from the CCD solid-state image-capturing elements 112R, 112G, and 112B, respectively, a process for amplifying the sampled-and-held signal of each pixel, and an A/D conversion process for converting the amplified signal of each pixel from an analog signal to a digital signal and for obtaining red, green, blue digital color signals Rd, Gd, and Bd.

For this purpose, the analog signal processor 113 is formed of sample-and-hold circuits (S/H) 114R, 114G, and 114B, video amplifiers (VA) 115R, 115G, and 115B, and A/D converters 116R, 116G, and 116B, which correspond to the red, green, and blue color signals, respectively.

The digital signal processor 117 performs processing such as color correction, high-frequency correction, gamma correction, and high-luminance compression, and signal processing for enabling an image to be viewed beautifully, on each of the digital color signals Rd, Gd, and Bd of red, green, and blue, which are obtained by the analog signal processor 113. Furthermore, on the basis of the processed digital color signals Rd, Gd, and Bd, the digital signal processor 117 performs a matrix process in order to generate a luminance signal Y and color difference signals Cb/Cr, which are digital video signals as the main line signals. The luminance signal Y and the color difference signals Cb/Cr are each, for example, 10-bit parallel data.

The converter 118 converts the luminance signal Y and the color difference signals Cb/Cr as the main line signals obtained by the digital signal processor 117 from the parallel data to serial data by using HD-SDI (Serial Digital Interface) that is a digital serial transmission standard, and supplies the converted serial data to the conversion unit 102. Furthermore, the converter 118 converts the serial data of the HD-SDI, which is related to the return video signal Ret. Video supplied from the conversion unit 102, into parallel data and supplies the data to the viewfinder 119.

The viewfinder 119 selectively displays, for example, a captured-image video signal, that is, an image by the main line signal, or an image by the return video signal Ret. Video. This selection operation can be performed using a button (not shown) by, for example, a cameraman.

The conversion unit 102 includes a converter 121 for converting serial data into parallel data, a signal divider 122, modulation processors 123a to 123f, frequency shifters 124a to 124f, a multiplex filter (MPX filter) 125, and frequency shifters 126a to 126c, demodulation processors 127a to 127c, a signal combiner 128, and a converter 129 for converting parallel data into serial data.

The converter 121 converts serial data of HD-SDI, which is related to the main line signals (the luminance signal Y and the color difference signals Cb/Cr) supplied from the camera 101, into parallel data of the luminance signal Y and the color difference signals Cb/Cr.

The signal divider 122 divides the luminance signal Y and the color difference signals Cb/Cr, which are obtained by the converter 121, into three signal groups. In this case, the bit rate of each signal group is ⅓ the bit rate of the luminance signal Y or the color difference signals Cb/Cr. The modulation processors 123a to 123f perform a modulation process of the OFDM method on the six signal groups obtained by the signal divider 122 and generate modulation signals My1, My2, My3, Mc1, Mc2, and Mc3 correspondingly, which are related to the luminance signal Y and the color difference signals Cb/Cr.

Figure 4:
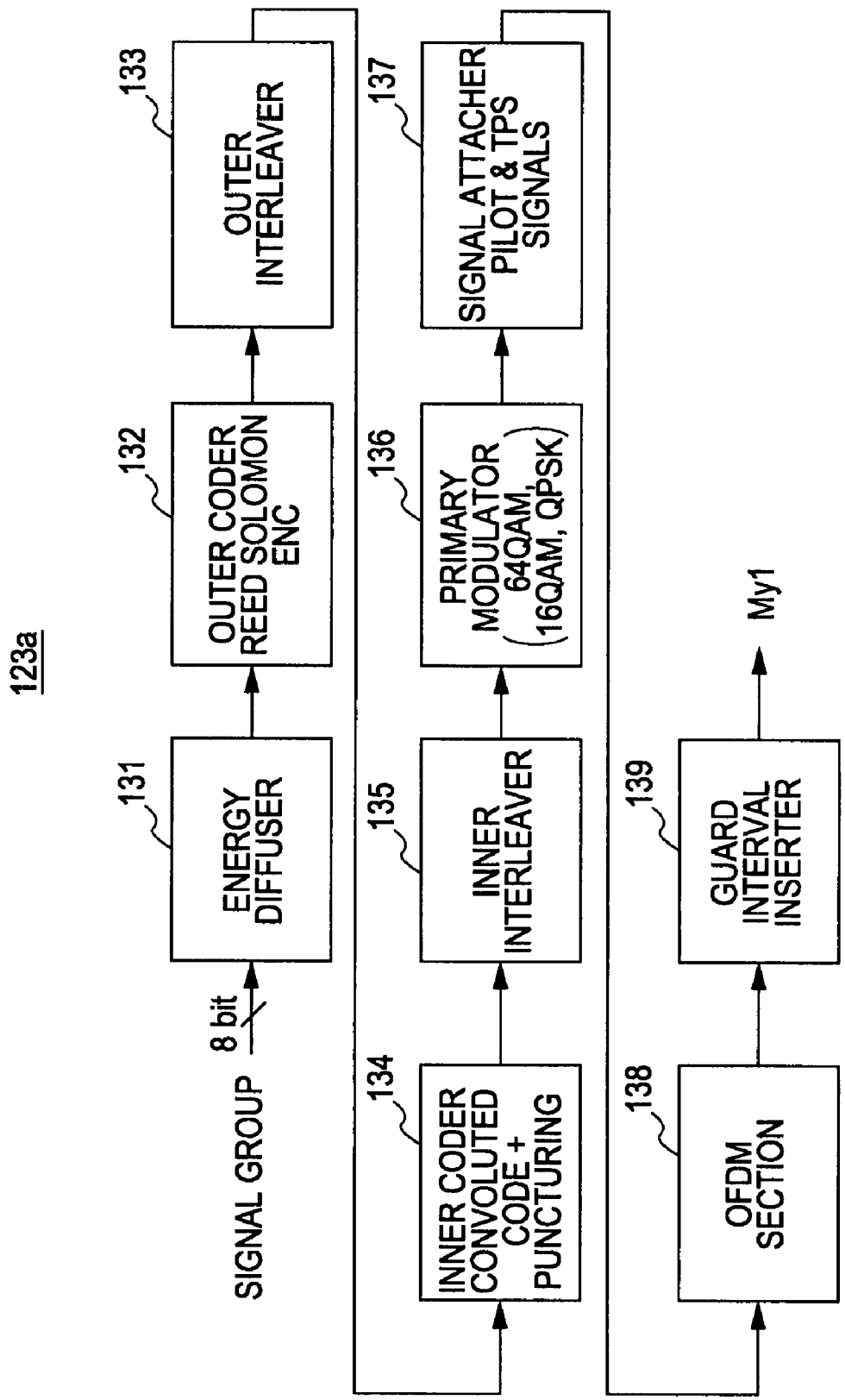
FIG. 4 is a block diagram showing the configuration of a modulation processor for performing a modulation process by an OFDM method.

A description will now be given of the configuration of the modulation processors 123a to 123f. Here, a description is given by using the modulation processor 123a as an example. Although detailed description has been omitted, the modulation processors 123b to 123f are configured identically to the modulation processor 123a. FIG. 4 shows a specific configuration of the modulation processor 123a.

The energy of the signal group that is 8-bit parallel data is diffused by an energy diffuser 131, and signal processing with which error correction is possible is performed by an outer coder 132. Thereafter, an outer interleaver 133 interleaves a signal for the purpose of improving robustness against errors during transmission. In the outer coder 132, usually, error correction code like a Reed-Solomon code is attached.

Convolution coding is performed on a signal output from the outer interleaver 133 in order to correct errors by an inner coder 134, and the signal is interleaved by an inner interleaver 135. Thereafter, primary modulation, such as QAM (Quadrature Amplitude Modulation) or PSK (Phase Shift Keying) is performed by a primary modulator 136.

Thereafter, in a signal attacher 137, a pilot signal and a transmission parameter signal (TPS) that are necessary to perform demodulation on the reception side are attached. Furthermore, an OFDM section 138 performs orthogonal frequency division multiplexing modulation, and thereafter a guard interval inserter 139 attaches a signal for reflection on the transmission line, which is called a guard interval, and a modulation signal My1 related to the above-described input signal group is obtained.

Referring back to FIG. 3, the frequency shifters 124a to 124f shift in frequency the frequency bands of the six modulation signals My1 to Mc3 related to the luminance signal Y and the color difference signals Cb/Cr, which are obtained by the modulation processors 123a to 123f from a baseband so that their respective center frequencies become F1 to F6 (See FIG. 2). The frequency shifters 124a to 124f are each formed of a multiplier and perform a shift process by applying the frequency signals (carrier wave signals) of the frequencies F1 to F6 to the modulation signals My1 to Mc3, respectively.

The multiplex filter 125 combines the modulation signals My1 to Mc3 that are shifted by the frequency shifters 124a to 124f and sends the signals to the triaxial cable 103, and separates and extracts from the triaxial cable 103, three modulation signals Mr1, Mr2, and Mr3 related to the return video signal Ret. Video (Y) sent from the CCU 105, in which their respective center frequencies are F7 to F9 (See FIG. 2).

The frequency shifters 126a to 126c shift the frequency bands of the modulation signals Mr1 to Mr3 extracted by the multiplex filter 125 to the baseband. The frequency shifters 126a to 126c are each formed of a multiplier and perform a shift process by applying frequency signals of frequencies F7 to F9 to the modulation signals Mr1 to Mr3, respectively.

The demodulation processors 127a to 127c perform a demodulation process of the OFDM method on the modulation signals Mr1 to Mr3 that are shifted by the shift process by the frequency shifters 126a to 126c, and generate three signal groups related to the return video signal Ret. Video, each of which signal groups is 8-bit parallel data. Although detailed description has been omitted, the demodulation processors 127a to 127c are configured to perform processing reverse to that of the modulation processors 123a to 123f.

The signal combiner 128 combines the three signal groups that are generated by the demodulation processors 127a to 127c in order to generate a return video signal Ret. Video that is 10-bit parallel data. The converter 129 converts the return video signal Ret. Video generated by the signal combiner 128 from parallel data to serial data of HD-SDI and supplies the converted serial data to the camera 101.

A description will be given of the operation on the side of the camera 101 shown in FIG. 3.

On the image-capturing plane of the image-capturing elements 112R, 112G, and 112B, optical signals of red, green, and blue are formed by the image-capturing optical system 111. Then, photoelectrical conversion is performed by the image-capturing elements 112R, 112G, and 112B, and image-capturing signals R, G, and B of red, green, and blue are obtained from the image-capturing elements 112R, 112G, and 112B, respectively. The image-capturing signals R, G, and B are supplied to the analog signal processor 113, where a sample-and-hold process, an amplification process, an A/D conversion process, and the like are performed to obtain digital color signals Rd, Gd, and Bd of red, green, and blue.

The color signals Rd, Gd, and Bd are supplied to the digital signal processor 117, where processing, such as color correction, high-frequency correction, gamma correction, and high-luminance compression, is performed, and signal processing for enabling an image to be viewed beautifully are performed. On the basis of the processed digital color signals Rd, Gd, and Bd, the digital signal processor 117 performs a matrix process and generates digital video signals (the luminance signal Y and the color difference signals Cb/Cr) as main line signals to be supplied to the CCU 105.

The luminance signal Y and the color difference signals Cb/Cr are supplied to the converter 118, where they are converted from the parallel data to serial data of HD-SDI. Then, the converted serial data is supplied to the converter 121 of the conversion unit 102 as an output from the camera 101. In the converter 121, the serial data of HD-SDI, which is related to the main line signals (the luminance signal Y and the color difference signals Cb/Cr), which are supplied from the camera 101, is converted into parallel data of the luminance signal Y and the color difference signals Cb/Cr.

The luminance signal Y and the color difference signals Cb/Cr, which are 10-bit parallel data output from the converter 121, are supplied to the signal divider 122. In the signal divider 122, the luminance signal Y is divided into, for example, three signal groups, each of which is 8-bit parallel data, and the color difference signals Cb/Cr are each divided into three signal groups, each of which is 8-bit parallel data.

The six signal groups obtained by being divided by the signal divider 122 are supplied to the modulation processors 123a to 123f, correspondingly. In the modulation processors 123a to 123f, the signal groups, each of which is 8-bit parallel data, are modulated by the OFDM method, and modulation signals My1 to My3 related to the luminance signal Y and modulation signals Mc1 to Mc3 related to the color difference signals Cb/Cr are generated.

The modulation signals My1 to Mc3 generated by the modulation processors 123a to 123f are supplied to the frequency shifters 124a to 124f, respectively. In the frequency shifters 124a to 124f, the frequency bands of the modulation signals My1 to Mc3 are shifted in frequency from a baseband so that their respective center frequencies become F1 to F6.

The modulation signals My1 to Mc3 that are shifted by the frequency shifters 124a to 124f are combined by the multiplex filter 125 and are sent to the triaxial cable 103. As a result, the modulation signals My1 to Mc3 related to the main line signals (the luminance signal Y and the color difference signals Cb/Cr) are sent to the CCU 105 via the triaxial cable 103.

The multiplex filter 125 separates and extracts from the from the triaxial cable 103, the modulation signals Mr1 to Mr3, in which their respective center frequencies are F7 to F9, which are related to the return video signal Ret. Video (Y) sent from the CCU 105.

The modulation signals Mr1 to Mr3 are supplied to the frequency shifters 126a to 126c, where their respective frequency bands are shifted to the baseband. The shifted modulation signals Mr1 to Mr3 are supplied to the demodulation processors 127a to 127c, respectively. In the demodulation processors 127a to 127c, the modulation signals Mr1 to Mr3 are demodulated by the OFDM method, respectively, and three signal groups related to the return video signal Ret. Video, each of which signal groups is, for example, 8-bit parallel data, are generated.

The three signal groups are combined by the signal combiner 128, and a return video signal Ret. Video that is 10-bit parallel data is obtained. The return video signal Ret. Video is supplied to the converter 129, where the parallel data is converted into serial data of HD-SDI. Then, the converted serial data is supplied as an output from the conversion unit 102 to the converter 118 of the camera 101.

In the converter 118, the serial data of HD-SDI, which is related to the return video signal Ret. Video supplied from the conversion unit 102, is converted into parallel data and is supplied to the viewfinder 119. For example, a captured-image video signal is also supplied from the digital signal processor 117 to the viewfinder 119. In the viewfinder 119, an image by the main line signal or an image by the return video signal Ret. Video is selectively displayed in response to a button operation by the cameraman.

Figure 5:
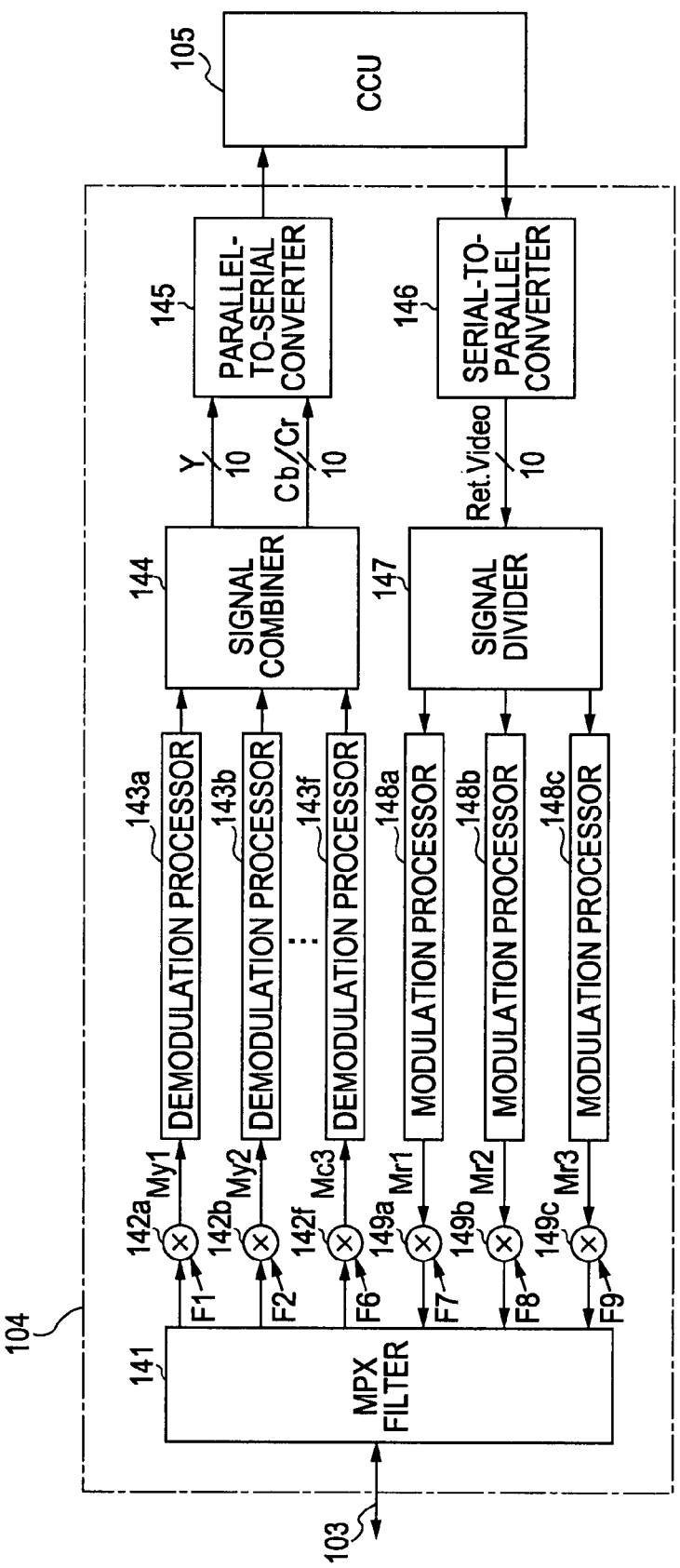
FIG. 5 is a block diagram showing a detailed configuration of a conversion unit on the CCU side.
Figure 6:
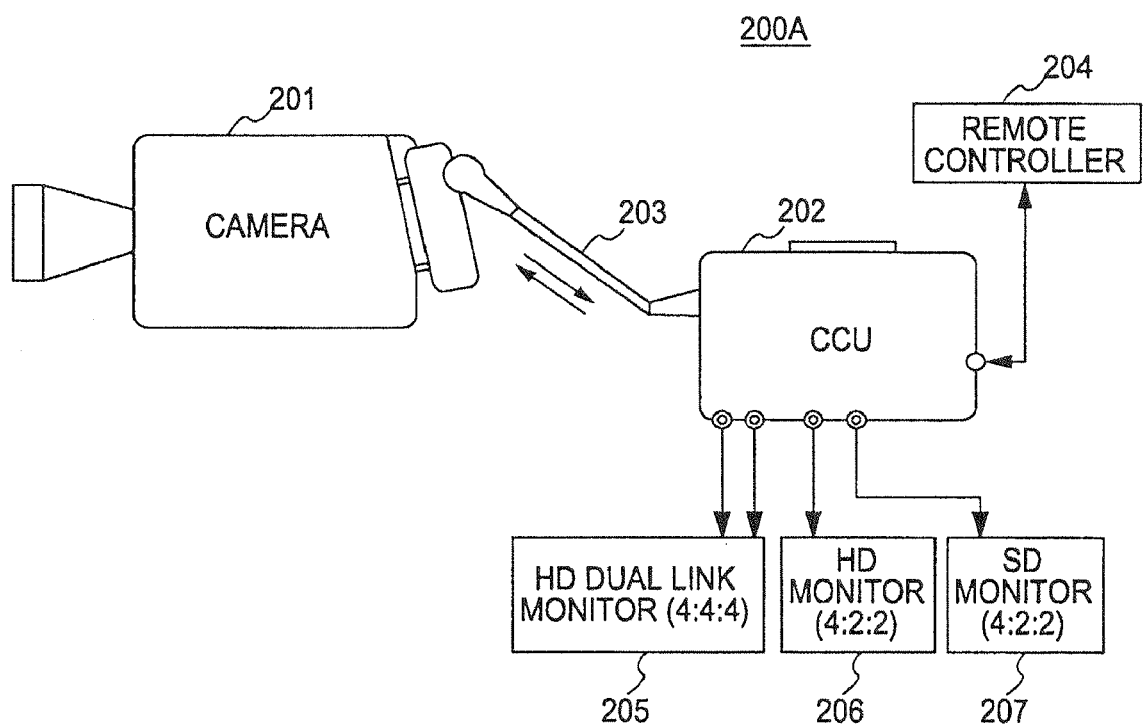
FIG. 6 is a block diagram showing the configuration of a transmission system using an optical fiber cable in the related art.
Figure 7:
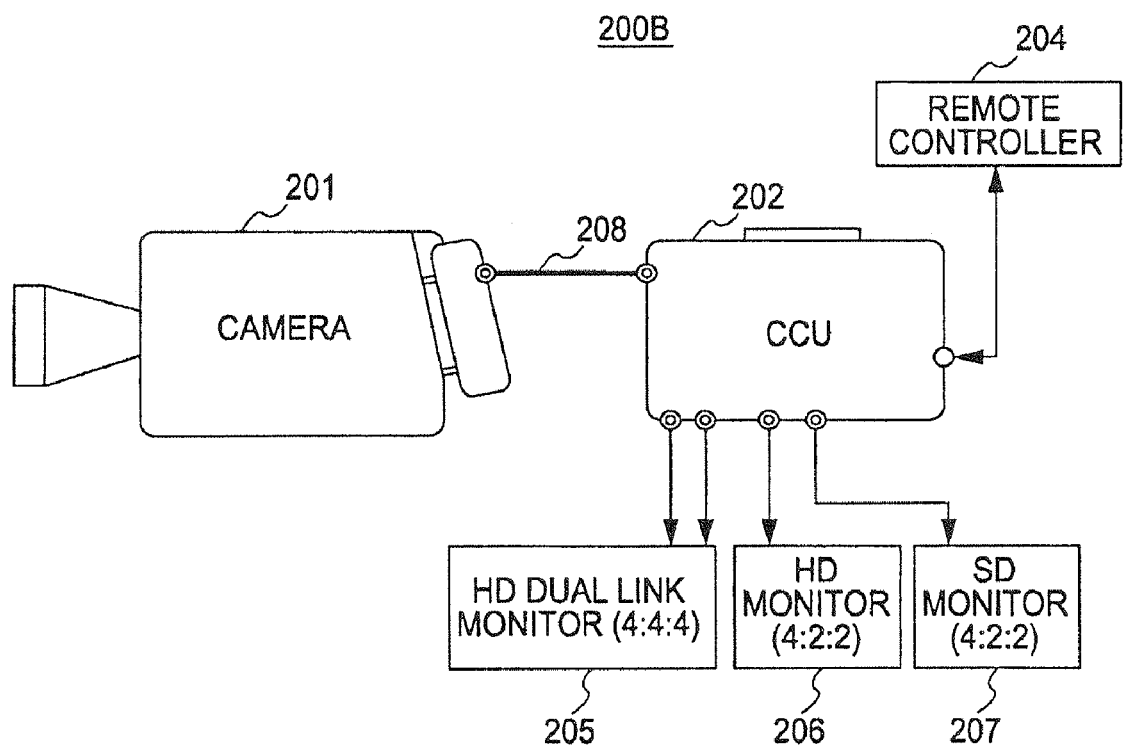
FIG. 7 is a block diagram showing the configuration of an analog transmission system using a triaxial cable in the related art.
Figure 8:
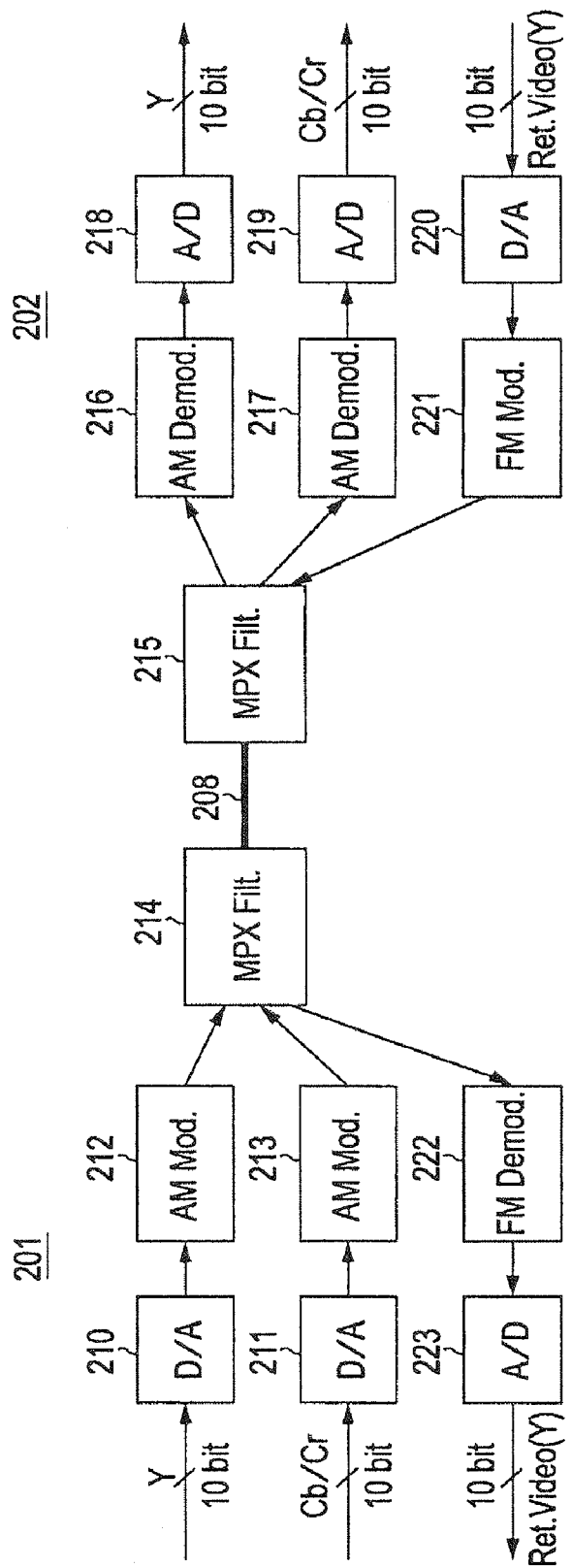
FIG. 8 is a block diagram showing an example of a circuit configuration on the camera side and on the CCU side in an analog transmission system using a triaxial cable in the related art.
Figure 9:
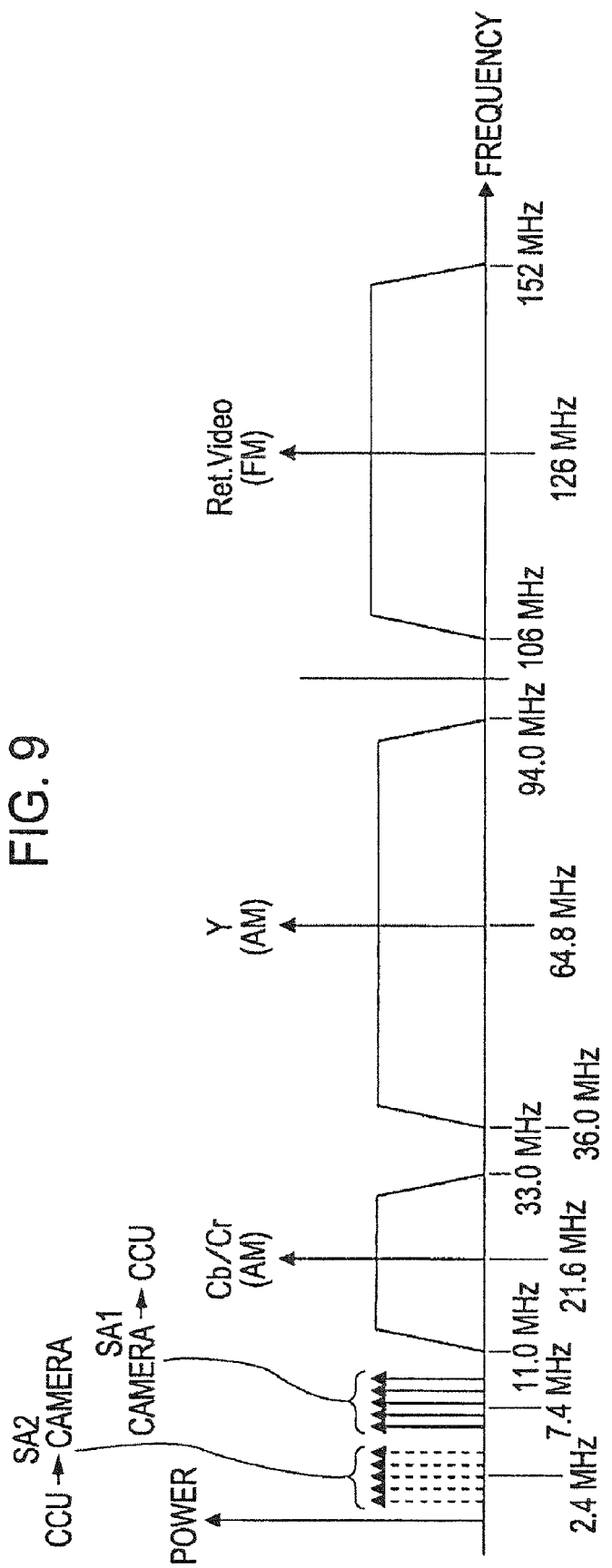
FIG. 9 shows an example of the arrangement of frequencies of an analog transmission system using a triaxial cable in the related art.

Next, a description of the details of the configuration of the conversion unit 104 on the CCU 105 side will be given. FIG. 5 shows the configuration of the conversion unit 104.

The conversion unit 104 includes a multiplex filter 141, frequency shifters 142a to 142f, demodulation processors 143a to 143f, a signal combiner 144, a converter 145 for converting parallel data into serial data, a converter 146 for converting serial data into parallel data, a signal divider 147, modulation processors 148a to 148c, and frequency shifters 149a to 149c.

The multiplex filter 141 separates and extracts from the triaxial cable 103, modulation signals My1 to Mc3 related to the luminance signal Y and the color difference signals Cb/Cr as the main line signals, the modulation signals My1 to Mc3 being sent from the camera 101. Here, the modulation signals My1 to Mc3 have been shifted so that their respective center frequencies are F1 to F6 (See FIG. 2).

Furthermore, the multiplex filter 141 combines the modulation signals Mr1 to Mr3 related to the return video signal Ret. Video (Y), which have been shifted by the frequency shifters 149a to 149c, and sends the signals to the triaxial cable 103. The frequency shifters 142a to 142f shift the frequency bands of the modulation signals My1 to Mc3 extracted by the multiplex filter 141 to the baseband, respectively. The frequency shifters 142a to 142f are each formed of a multiplier and perform a shift process by applying frequency signals of frequencies F1 to F6 to the modulation signals My1 to Mc3, respectively.

The demodulation processors 143a to 143f perform a demodulation process of the OFDM method on the modulation signals My1 to Mc3 that have been shifted by the frequency shifters 142a to 142f, respectively, and generate signal groups related to the luminance signal Y and the color difference signals Cb/Cr, each of which signal groups is 8-bit parallel data. Although detailed description has been omitted, the demodulation processors 143a to 143f are configured to perform processing reverse to that of the modulation processors 123a to 123f.

The signal combiner 144 combines the six signal groups generated by the demodulation processors 143a to 143f and generates a luminance signal Y and color difference signals Cb/Cr that are 10-bit parallel data. The converter 145 converts the luminance signal Y and the color difference signals Cb/Cr generated by the signal combiner 144 from parallel data to serial data of HD-SDI, and supplies the converted serial data to the CCU 105.

The converter 146 converts the serial data of HD-SDI related to the return video signal Ret. Video (Y) supplied from the CCU 105 into parallel data. The signal divider 147 divides the return video signal Ret. Video obtained by the converter 146 into three signal groups. In this case, the bit rate of each signal group is ⅓ the bit rate of the return video signal Ret. Video.

The modulation processors 148a to 148c perform a modulation process of the OFDM method on the three signal groups obtained by the signal divider 147, and generate three modulation signals Mr1 to Mr3 related to the return video signal Ret. Video, respectively. Although detailed description has been omitted, the modulation processors 148a to 148c are configured identically to the above-described modulation processors 123a to 123f.

The frequency shifters 149a to 149c shift the frequency bands of the three modulation signals Mr1 to Mr3 related to the return video signal Ret. Video, which are obtained by the modulation processors 148a to 148c, from the baseband so that their respective center frequencies become F7 to F9 (See FIG. 2). The frequency shifters 149a to 149c are each formed of a multiplier and perform a shift process by applying frequency signals (carrier wave signals) of frequencies F7 to F9 to the modulation signals Mr1 to Mr3, respectively.

The operation of the conversion unit 104 shown in FIG. 5 on the CCU 105 side will be described below.

The multiplex filter 141 extracts, from the triaxial cable 103, six modulation signals My1 to Mc3, in which their respective center frequencies are F1 to F6, which are related to the main line signals (the luminance signal Y and the color difference signals Cb/Cr) sent from the camera 101.

The modulation signals My1 to Mc3 are supplied to the frequency shifters 142a to 142f, respectively, where the frequency bands are shifted to the baseband. The modulation signals My1 to Mc3 that have been shifted by the shift process are supplied to the demodulation processors 143a to 143f, respectively. In the demodulation processors 143a to 143f, the modulation signals My1 to Mc3 are demodulated, respectively, by the OFDM method, and six signal groups, each of which is 8-bit parallel data, which are related to the luminance signal Y and the color difference signals Cb/Cr, are generated.

The six signal groups are combined by the signal combiner 144, thereby obtaining a luminance signal Y and color difference signals Cb/Cr, each of which is 10-bit parallel data. The luminance signal Y and the color difference signals Cb/Cr are supplied to the converter 145, where the parallel data is converted into serial data of HD-SDI. Then, the converted serial data is supplied as an output from the conversion unit 104 to the CCU 105.

Furthermore, the serial data of HD-SDI, which is related to the return video signal Ret. Video (Y) supplied from the CCU 105, is supplied to the converter 146. In the converter 146, the serial data is converted into parallel data of the return video signal Ret. Video.

The return video signal Ret. Video is supplied to the signal divider 147. In the signal divider 147, the return video signal Ret. Video is divided into three signal groups, each of which is 8-bit parallel data. The three signal groups are correspondingly supplied to the modulation processors 148a to 148c. In the modulation processors 148a to 148c, signal groups, each of which is 8-bit parallel data, are modulated by the OFDM method, and modulation signals Mr1 to Mr3 related to the return video signal Ret. Video are generated.

The modulation signals Mr1 to Mr3 generated by the modulation processors 148a to 148c are supplied to the frequency shifters 149a to 149c, respectively. In the frequency shifters 149a to 149c, the frequency bands of the modulation signals Mr1 to Mr3 are shifted in frequency from the baseband so that their respective center frequencies become F7 to F9.

The modulation signals Mr1 to Mr3 that have been shifted by the frequency shifters 149a to 149c, respectively, are combined by the multiplex filter 141 and are sent to the triaxial cable 103. As a result, the modulation signals Mr1 to Mr3 related to the return video signal Ret. Video (Y) are sent to the camera 101 via the triaxial cable 103.

As described above, according to the transmission system 100 shown in FIG. 1, the main line signals (the luminance signal Y and the color difference signals Cb/Cr) to be transmitted from the camera 101 to the CCU 105 is divided into a plurality of signal groups by the conversion unit 102, thereafter are modulated by the OFDM method, and are sent to the triaxial cable 103. On the other hand, the return video signal Ret. Video (Y) to be transmitted from the CCU 105 to the camera 101 is divided into a plurality of signal groups by the conversion unit 104, thereafter is modulated by the OFDM method, and is sent to the triaxial cable 103.

As described above, since each of the digital video signals (the luminance signal Y, the color difference signals Cb/Cr, and the return video signal Ret. Video) is divided into a plurality of signal groups and the bit rate is decreased, even if the bit rate of the video signals is high like an HD video signal, it is possible to perform digital modulation (modulation of the OFDM method).

Furthermore, since modulation of the OFDM method is performed as digital modulation, the symbol rate can be decreased so as to be lower than the bit rate of the luminance signal Y, the color difference signals Cb/Cr, or the return video signal Ret. Video (Y). Therefore, even if reflection occurs in the connector portion or the like, the influence thereof is not easily received, and the digital signal can be satisfactorily transmitted via the coaxial cable.

Since transmission is performed using many carrier waves as a result of the modulation of the OFDM method, several waves among the many waves can be assigned to a pilot signal, a transmission parameter signal, and the like. Therefore, this is advantageous when AGC (automatic gain control) and cable equalization are performed.

According to the transmission system 100 shown in FIG. 1, a frequency shift process is performed so that the frequency bands of the modulation signals My1 to Mc3 related to the main line signals (the luminance signal Y and the color difference signals Cb/Cr) to be transmitted from the camera 101 to the CCU 105 and the frequency bands of the modulation signals Mr1 to Mr3 related to the return video signal Ret. Video (Y) to be transmitted from the CCU 105 to the camera 101 do not overlap one another. Therefore, it is possible to satisfactorily transmit the modulation signals My1 to Mc3 and Mr1 to Mr3 by using one triaxial cable 103 in such a manner that the luminance signal Y, the color difference signals Cb/Cr, and the return video signal Ret. Video do not interfere with one another.

According to the transmission system 100 shown in FIG. 1, the camera 101 and the CCU 105 are connected to each other with one triaxial cable 103, and since the connection between the camera 101 and the CCU 105 is very simple, the transmission system 100 can be easily moved. Furthermore, the triaxial cable has high reliability and is inexpensive compared with an optical fiber cable. This is in contrast with that two optical fiber cables are used to perform bidirectional transmission.

In the transmission system 100 shown in FIG. 1, the camera 101 and the CCU 105 are connected to each other with the triaxial cable 103 that is a coaxial cable. Connectors can be easily connected anytime and in any environment or place and also, multi-stage connection of coaxial cables can be easily performed. Even if a coaxial cable is broken, repair can be easily performed. There is no need to be concerned with the accumulation of dirt on connectors unlike in the case of optical fiber cables, and connector connection is possible in an environment in which there is much rain and dust.

According to the transmission system 100 shown in FIG. 1, the luminance signal Y, the color difference signals Cb/Cr, and the return video signal Ret. Video (Y) that are digital signals are modulated by the OFDM method and transmitted. The digital signals are not converted into analog signals, are not AM- or FM-modulated, and are not transmitted. The deterioration of the S/N does not occur, and transmission at a distance longer than that of an analog transmission system becomes possible. A relay may be provided halfway as necessary so that transmission over a longer distance can be performed.

In the above-described embodiments, the luminance signal Y and the color difference signals Cb/Cr as the main line signals output from the camera 101 are supplied to the conversion unit 102 and are modulated by the OFDM method. Alternatively, the camera 101 may have the same function as that of the conversion unit 102. In this case, the converter 118 in the camera 101 of FIG. 3 and the converters 121 and 129 are not necessary.

In the above-described embodiments, the return video signal Ret. Video (Y) output from the CCU 105 is supplied to the conversion unit 104, where modulation is performed by means of the OFDM method. Alternatively, the CCU 105 may have the same function as that of the conversion unit 104. In this case, the converters 145 and 146 in the conversion unit 104 of FIG. 5 and conversion (not shown) in the CCU 105 are not necessary.

In the above embodiments, a case has been described in which the luminance signal Y, the color difference signals Cb/Cr, and the return video signal Ret. Video, which are 10-bit parallel data, are directly divided into a plurality of signal groups by the signal dividers 122 and 147. Alternatively, after a data compression process is performed on these signals, the signals may be divided into a plurality of signal groups. As a result, the bit rate can be decreased further, and digital modulation becomes easier. In this case, in the signal combiners 128 and 144 on the reception side, a data expansion process is performed.

In the above embodiments, the present invention is applied to the transmission system for transmitting a digital video signal. The present invention can similarly be applied to a case in which other digital signals are transmitted.

The present invention is capable of satisfactorily transmitting a digital signal via a coaxial cable and can be applied to, for example, transmission of a video signal between a camera and a CCU.

It should be understood by those skilled in the art that various modifications, combinations, sub-combinations and alterations may occur depending on design requirements and other factors insofar as they are within the scope of the appended claims or the equivalents thereof.

What is claimed is:

1. A digital signal transmission system comprising:
   a first device;
   a second device; and
   a coaxial cable for connecting between the first device and the second device, a digital signal being transmitted between the first device and the second device via the coaxial cable,
   wherein the first device includes
   a first signal divider configured to divide a first digital signal to be transmitted to the second device into a plurality of signal groups, a plurality of first modulators configured to modulate each of the plurality of signal groups obtained from the first signal divider by using an orthogonal frequency division multiplexing method, a plurality of first frequency shifters configured to shift the frequency bands of a plurality of modulation signals generated by the plurality of first modulators from a baseband to a plurality of mutually different first frequency bands, and a first signal sender configured to combine a plurality of modulation signals whose frequency bands are shifted by the plurality of first frequency shifters and to send the combined signals to the coaxial cable, and wherein the second device includes a second signal divider configured to divide a second digital signal to be transmitted to the first device into a plurality of signal groups, a plurality of second modulators configured to modulate each of the plurality of signal groups obtained from the second signal divider by using an orthogonal frequency division multiplexing method, a plurality of second frequency shifters configured to shift each of the frequency bands of the plurality of modulation signals generated by the plurality of second modulators from the baseband to a plurality of second frequency bands that are mutually different from the plurality of first frequency bands, and a second signal sender configured to combine the plurality of modulation signals whose frequency bands are shifted by the plurality of second frequency shifters and to send the combined signals to the coaxial cable.

2. The digital signal transmission system according to claim 1, wherein the first device is a camera, the second device is a camera control unit, the first digital signal is a captured-image video signal to be transmitted from the camera to the camera control unit, and the second digital signal is a return video signal to be transmitted from the camera control unit to the camera.

* * * * *